United States Patent [19]

Bruchu

[11] Patent Number: 5,687,533
[45] Date of Patent: Nov. 18, 1997

[54] METHOD AND APPARATUS FOR CONNECTING WINDOW FRAME SEGMENTS

[75] Inventor: Todd W. Bruchu, Lake Elmo, Minn.

[73] Assignee: Andersen Corporation, Bayport, Minn.

[21] Appl. No.: 490,801

[22] Filed: Jun. 15, 1995

[51] Int. Cl.$^6$ ...................................................... E04B 1/38
[52] U.S. Cl. ...................... 52/656.9; 52/656.5; 403/231; 411/401; 411/417
[58] Field of Search ................................. 52/656.9, 656.1, 52/656.2, 656.3, 656.5, 656.6, 656.7; 403/231, 295, 403, 407.1

[56] References Cited

U.S. PATENT DOCUMENTS

| | | | |
|---|---|---|---|
| 2,781,112 | 2/1957 | Fischer | 52/656.6 |
| 3,835,354 | 9/1974 | Torres-Pena | 52/656.1 |
| 3,854,831 | 12/1974 | Gutner | 52/656.9 |
| 4,012,153 | 3/1977 | Pidgeon et al. | 52/656.9 |
| 4,024,690 | 5/1977 | Collins et al. | 52/656.6 |
| 4,036,371 | 7/1977 | Michel | 403/231 |
| 4,527,364 | 7/1985 | Baus | 403/231 |
| 4,739,600 | 4/1988 | Lynch et al. | 52/656.9 |

*Primary Examiner*—Michael Safavi
*Attorney, Agent, or Firm*—Merchant, Gould, Smith, Edell, Welter & Schmidt, P.A.

[57] ABSTRACT

A corner lock includes a first member that is secured to a first window frame segment and a second member that is secured to the first member and a second window frame segment. The first member is inserted into an opening in an end of the first window frame segment, and a partial turn thereof anchors the first member relative to the first window frame segment. A ring on a protruding end of the first member abuts an end of the second window frame segment, and the second member inserts through this ring and is secured within the end of the second window frame segment.

20 Claims, 8 Drawing Sheets

METHOD AND APPARATUS FOR CONNECTING WINDOW FRAME SEGMENTS

FIELD OF THE INVENTION

The present invention relates to methods and apparatus for connecting window frame members together to form a corner.

Background of the Invention

A typical window includes a sash mounted within a frame formed by adjoining frame segments which are connected to form corners. In some applications, the frame segments may be plastic extrusions having a common profile, in which case the ends of adjoining segments can be mitered at a forty-five degree angle and welded to one another. However, if the segments do not have a common profile, then welding may prove unreliable due to insufficient overlap of material at the adjoining ends. In such cases, a need exists for an alternative fastening method that is cost effective and reliable.

SUMMARY OF THE INVENTION

The present invention provides a method and apparatus for connecting extruded frame members to one another. A first fastener is inserted into an end of a first frame member and is rotated approximately sixty degrees and thereby locked in place. In particular, the first fastener is threaded like a screw, but opposite sides thereof are flattened, so that the profile of the first fastener is relatively long as measured between the threads and relatively thin as measured between the flattened surfaces.

The first fastener inserts into an opening which also has a profile that may be described as relatively long and thin. When the threads on the first fastener are aligned with the relatively longer dimension of the opening profile, the first fastener may be readily inserted into the opening. However, when the first fastener is subsequently rotated within the opening, the threads engage the walls defining the relatively smaller dimension of the opening profile, and the threads cut into these walls to retain the first fastener in place.

A ring on an outer end of the first fastener is sized and configured to abut an end of a second frame segment. A second fastener, in the form of a screw, is inserted through the ring and into an opening in the second frame segment, thereby capturing the ring therebetween. Many advantages of the present invention will become apparent from the more detailed description of the preferred embodiment that follows.

BRIEF DESCRIPTION OF THE DRAWING

With reference to the Figures of the Drawing, wherein like numerals represent like parts and assemblies throughout the several views.

DETAILED DESCRIPTION OF THE PREFERRED EMBODIMENT

Preferred embodiment corner fasteners, constructed according to the principles of the present invention, are designated as 300 and 350 in FIGS. 1–15b. In a preferred application, the corner fasteners 300 and 350 are used to connect opposite ends of a sill jamb 100 to lower ends of respective side jambs 200 on a pocket replacement type of double hung window 99. Generally speaking, installation of a pocket replacement window involves removal of molding from one side of an existing window, typically the outside trim molding. The sash members are then removed from the frame of the existing window, leaving the interior trim intact and providing access for installation of a replacement window.

In addition to the sill jamb 100 and a pair of side jambs 200, the pocket replacement window 99 includes a head jamb (not shown), which has a profile or cross-section identical to that of the side jambs 200. The jambs are extrusions of a composite material including wood and PVC, which is the subject of U.S. patent application Ser. No. 07/938,364, filed by Michael J. Deaner et al. on Aug. 31, 1992, which was continued as Ser. No. 08/224,396 on Apr. 7, 1994. Other U.S. patent applications directed to this composite material include Ser. No. 07/938,365, filed by Michael J. Deaner et al. on Aug. 31, 1992, which was continued as Ser. No. 08/224,399 on Apr. 7, 1994; Ser. No. 08/017,240 filed by Michael J. Deaner et al. on Feb. 12, 1993; and Ser. No. 07/938,604, filed by Giuseppe Puppin et al. on Sep. 1, 1992.

The head jamb extends between and is welded to upper ends of respective side jambs 200. An upper sash and a lower sash are slidably mounted between the side jambs 200 and within the confines of the head jamb and the sill jamb 100.

Figure 2:
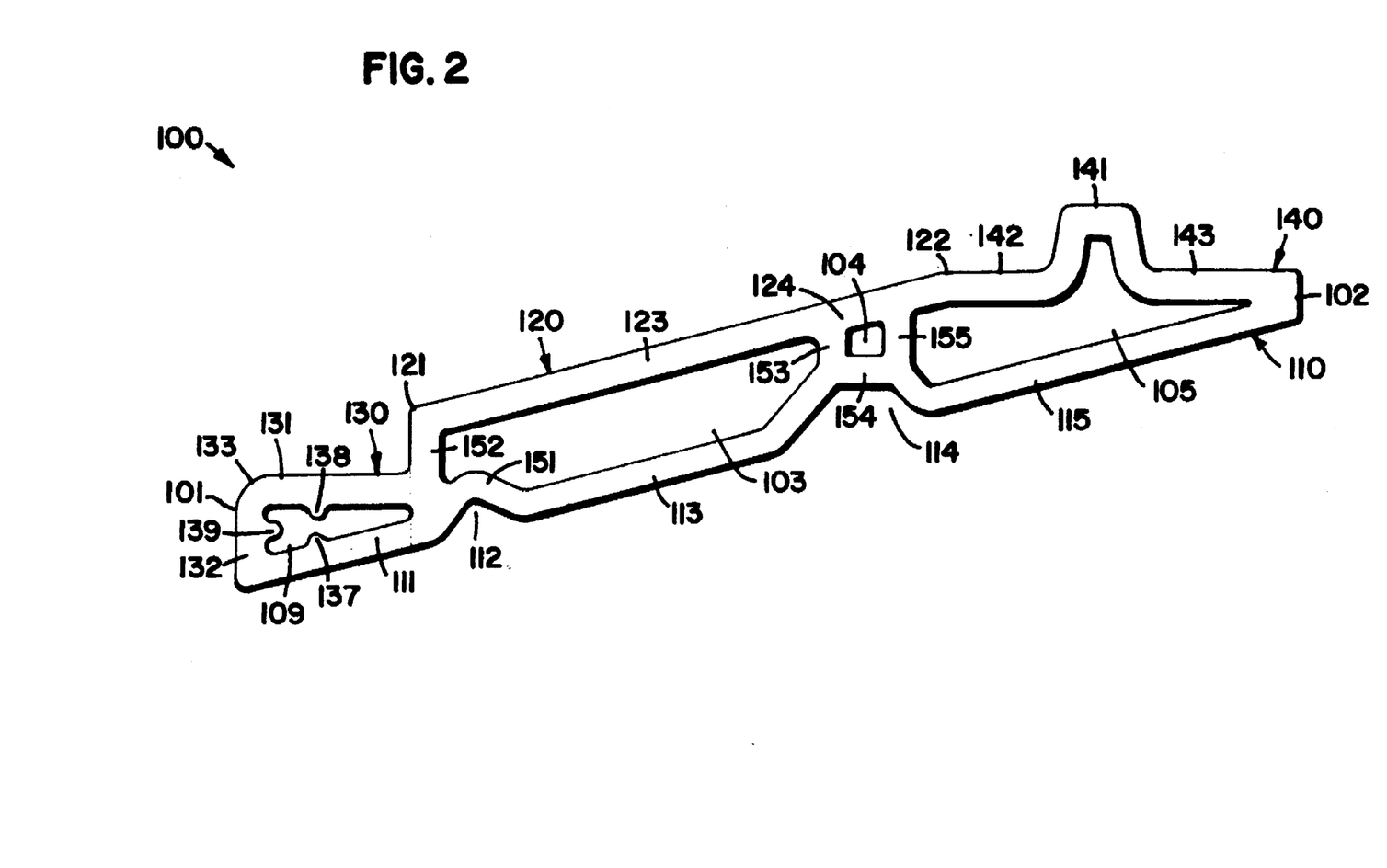
FIG. 2 is an end view of a sill member from the double hung window assembly of FIG. 1.

The profile of the sill jamb 100 is shown in FIG. 2. The sill jamb 100 profile extends from an outermost end 101 to an innermost end 102. Extending between the extreme ends 101 and 102 is a lower side 110 which is sized and configured to rest upon the sill of an existing window frame (from which an original or existing window was removed). The lower side 110 includes a first segment or base 111, a second segment or base 113, and a third segment or base 115, all of which extend generally parallel to one another. A first angular segment or generally V-shaped elbow 151 extends between and integrally interconnects the first base 111 and the second base 113. The angular segment 151 defines a generally V-shaped channel 112 between the first base 111 and the second base 113. The channel 112 extends parallel to the outside blind stops of the original window and receives a bead of silicone for purposes of sealing the lower side 110 of the sill 100 relative to the existing window frame.

A second angular segment or generally U-shaped elbow 154 extends between and integrally interconnects the second base 113 and the third base 115. The angular segment 154 defines a generally U-shaped channel 114 between the second base 113 and the third base 115 which allows screws to be countersunk relative to the lower side 110 of the sill 100 for purposes that will become apparent below. A first segment or bridge 153 and a second segment or bridge 155 are connected to the angular segment 154 and extend from their respective junctures away from the lower side 110. The bridges 153 and 155 define an opening or screw chase 104 therebetween to receive the screws that are countersunk relative to the lower side 110.

Relatively large openings 103 and 105 are disposed on opposite sides of the bridges 153 and 155, respectively, and the bridges 153 and 155 contribute to maintain the integrity of the structure about these openings 103 and 105, particularly as the screws are countersunk relative to the lower side 110. Generally speaking, the configuration of each compartment within the sill profile is a function of the perimeter of the sill profile and the more or less constant wall thickness of the various segments that comprise the sill profile, which is a function of the structural characteristics of the composite material from which the jambs are extruded.

The first base segment 111 cooperates with a first upper segment 131 and an outermost segment 132 to define a generally triangular lobe 130 having a perimeter 133. These same segments 111, 131, and 132 also cooperate to form a compartment 109 within the lobe 130. The first upper segment 131 is disposed above the first base segment 111 and is designed to extend generally horizontal when the first base segment 111 is supported on the sill of the existing frame. The outermost segment 132 extends generally vertical from an outermost end of the first upper segment 131 to an outermost end of the first base segment 111. A nub 137, 138, 139 extends from each segment 111, 131, 132, respectively, and into the compartment 109 for purposes that will become apparent below.

An angled sill segment 120 is disposed above the second base segment 113 and extends generally parallel thereto from an outermost end 121 to an innermost end 122. An intermediate segment 152 extends generally vertically upward from an innermost end of the first upper segment 131 to the outermost end 121 of the angled sill segment 120. A first portion 123 of the angled sill segment 120 is disposed above and bounds the relative large opening 103. A second portion 124 of the angled sill segment 120 is disposed above and bounds the screw chase 104. In other words, the bridges 153 and 155 extend between and integrally interconnect the angled sill segment 120 and the angular segment 154.

A bottom sash support 140 is disposed above the third base segment 115 and extends generally horizontal when the third base segment 115 is supported on the sill of an existing frame. The innermost end 122 of the angled sill segment 120 is integrally connected to an outermost end of the bottom sash support 140. The bottom sash support includes a generally rectangular rail or track 141 that extends upward between and thereby separates generally horizontal surfaces 142 and 143. The rail 141 engages weatherstrip material, disposed within a channel on the lower sash, when the lower sash is moved to a closed position relative to the sill jamb 100.

An innermost end of the bottom sash support 140 is integrally connected to an innermost end of the third base segment 115, and this juncture defines the innermost end 102 of the sill jamb 100. The bottom sash support 140, the third base segment 115, and the second bridge 155 cooperate to bound the relatively large opening 105.

Figure 3:
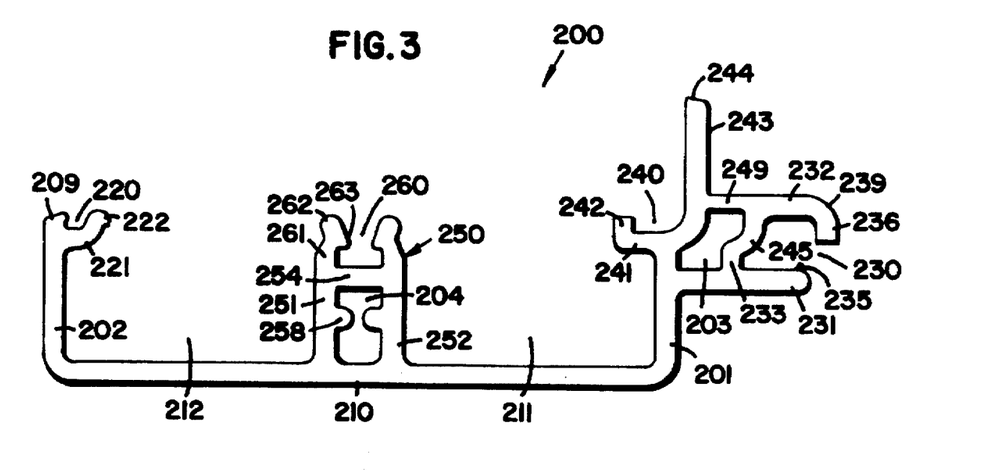
FIG. 3 is an end view of a side jamb member from the double hung window assembly of FIG. 1.

The profile of the side jamb 200 is shown in FIG. 3. As mentioned above, the head jamb has the same profile as both of the side jambs 200, thereby providing manufacturing efficiency and facilitating reliable welded connections therebetween. The profile of the side jamb 200 includes a linear base wall 210 that extends between an outer channel wall 201 and an inner channel wall 202. A divider 250 extends generally perpendicular from the base wall 210 between the channel walls 201 and 202 and generally parallel relative thereto. An outward wall 251 on the divider 250 cooperates with the outer channel wall 201 and the base wall 210 to define a first or outward channel 211. Similarly, an inward wall 252 on the divider 250 cooperates with the inner channel wall 202 and the base wall 210 to define a second or inward channel 212. Each of the channels 211 and 212 houses hardware (not shown) that facilitates movement of a respective window sash relative to the side jambs 200. The hardware is enclosed within the channels 211 and 212 by means of a cover 270 which is shown in and described with reference to FIGS. 4 and 5.

The divider 250 is symmetrical about a center line drawn perpendicular to the base wall 210 and thus, may described with reference to pairs of structural elements. For example, the outer wall 251 and the inner wall 252 are mirror images of one another relative to the center line. A transverse wall 254 extends between ends of the walls 251 and 252 opposite the base wall 210, and these four walls cooperate to define a generally rectangular compartment 204 therebetween. A nub 258 extends from each of the walls 251 and 252 and toward the other, giving the compartment 204 a configuration that may be said to be shaped generally like an hourglass.

A distal wall 261 extends from each end of the transverse wall 254, generally as an extension of a respective wall 251 and 252, but in slightly convergent manner, toward the center line. Each distal wall 261 terminates in a lip 262 that extends in divergent fashion from the distal wall 261 and relative to the center line. The juncture between each distally extending wall 261 and respective lip 262 includes a shoulder 263 that projects inward toward the center line. The distally extending walls 261, the lips 262, and the shoulders 263 cooperate to define a slot 260 having a profile that may be said to be similar in shape to the lower half of a vase.

Figure 4:
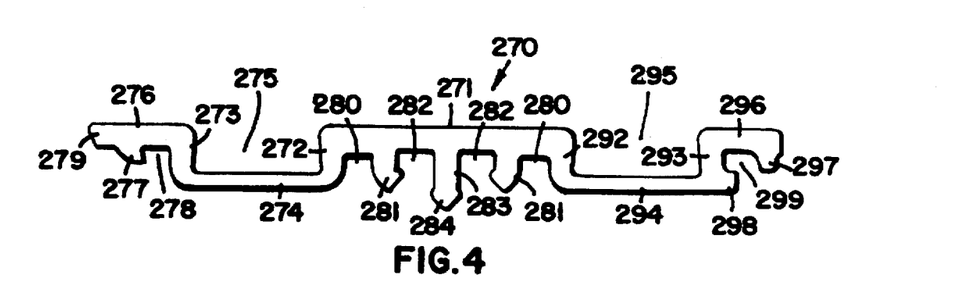
FIG. 4 is an opposite end view of a side cover member from the double hung window assembly of FIG. 1.
Figure 5:
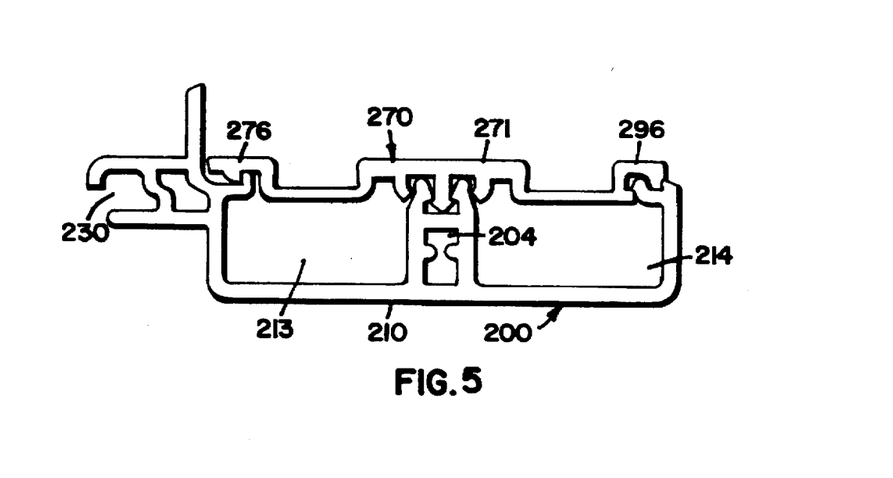
FIG. 5 is an opposite end view of the side cover member of FIG. 4 connected to the side jamb member of FIG. 3.
Figure 6:
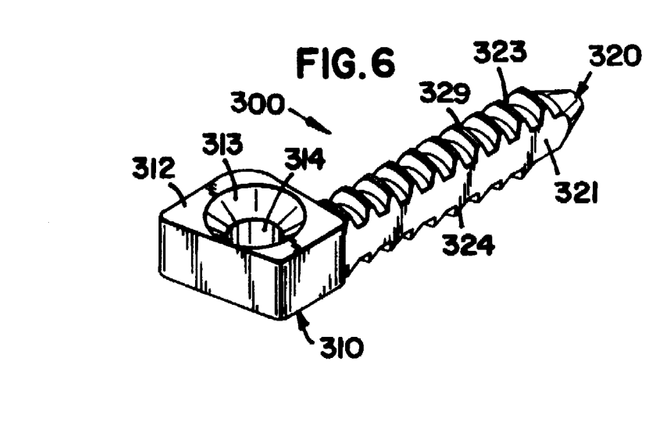
FIG. 6 is an isometric view of a corner lock member from the double hung window assembly of FIG. 1.
Figure 7:
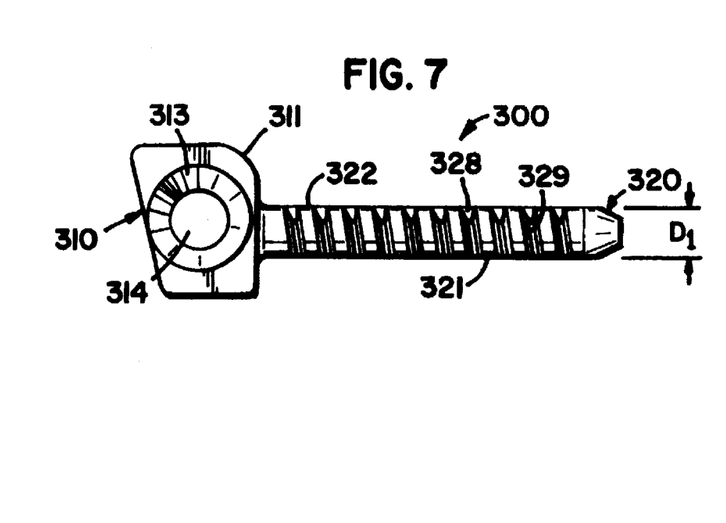
FIG. 7 is a top view of the corner lock member of FIG. 6.
Figure 8:
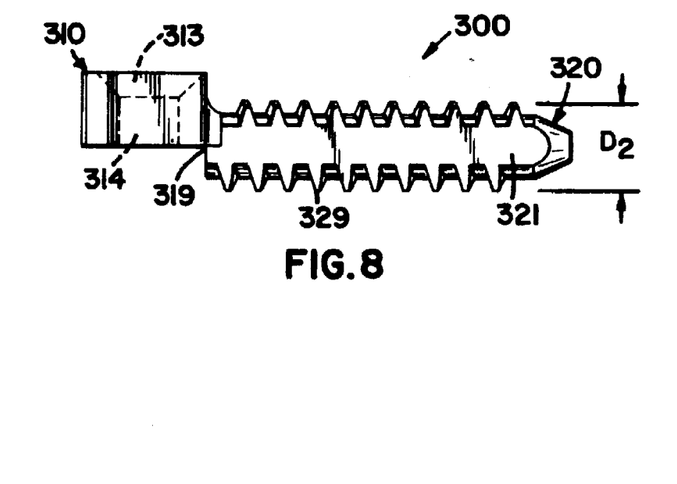
FIG. 8 is a side view of the corner lock member of FIG. 6.
Figure 9:
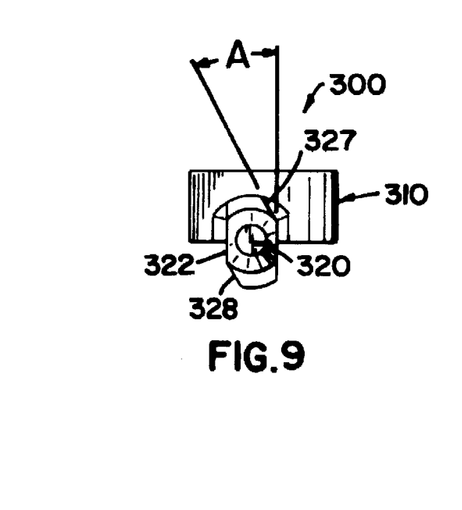
FIG. 9 is an end view of the corner lock member of FIG. 6.
Figure 10:
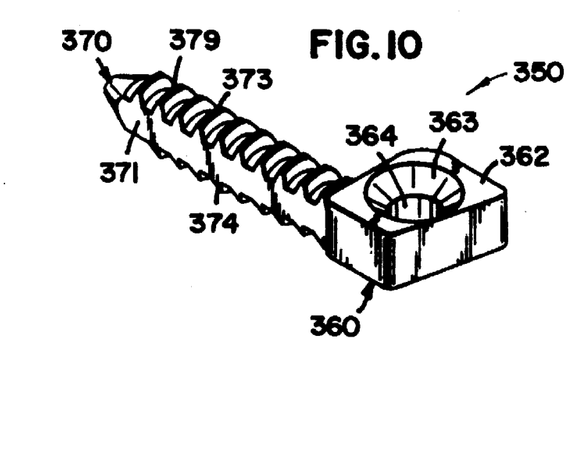
FIG. 10 is an isometric view of another corner lock member from an opposite, unshown corner of the double hung window assembly of FIG. 1.
Figure 11:
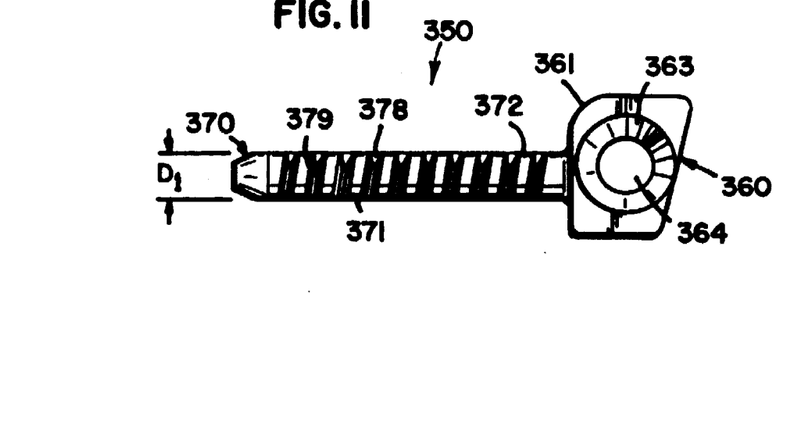
FIG. 11 is a top view of the corner lock member of FIG. 10.
Figure 12:
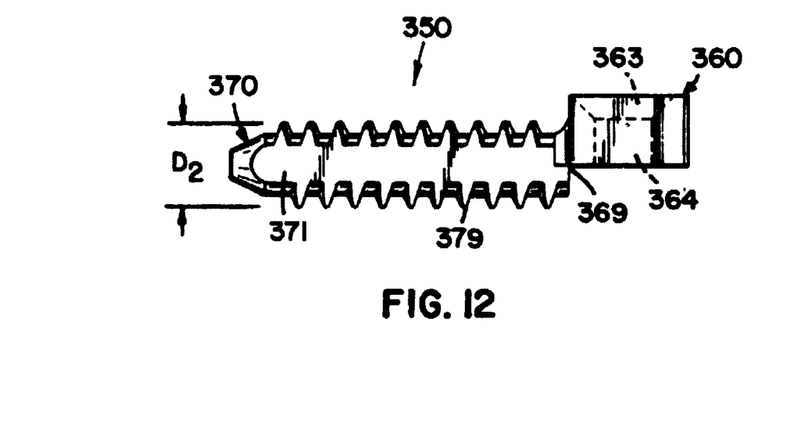
FIG. 12 is a side view of the corner lock member of FIG. 10.
Figure 13:
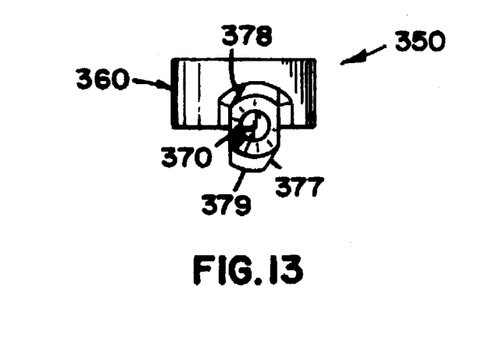
FIG. 13 is an end view of the corner lock member of FIG. 10.

The profile of the cover 270 is shown in FIG. 4 and includes a main segment 271 from which a spike 283 extends. The spike 283 has an oversized or enlarged tip 284 that snaps into the vase-shaped slot 260 in the side jamb 200. The divergent lips 262 guide the spike 283 into the slot 260, and the shoulders 263 retain the spike 283 therein. To each side of the spike 283, an arcuate segment 281 extends from the main segment 271 and curves toward the spike 283. Each of the arcuate segments 281 cooperates with the spike 283 and the main segment 271 to define a gap 282 into which a respective lip 262 inserts by snap fit to further secure the cover 270 relative to the side jamb 200, as shown in FIG. 5.

With reference back to FIG. 3, the side jamb 200 includes additional snap fit structure, connected to an end of the inward channel wall 202 opposite the base wall 210. This additional snap fit structure includes a distal wall segment or protrusion 209 that terminates in a rounded, outwardly directed point 223. Also, an arcuate wall 221 extends away from the channel wall 202 and curves away from the base wall 210, terminating in an end 222 which is opposite and flares away from the rounded point 223. The arcuate wall 221 and the distal wall 209 cooperate to define an angled, generally U-shaped groove 220 for purposes that will become apparent below.

As shown in FIG. 4, an inward end of the main segment 271 is integrally joined to a first inward channel sidewall 292, which extends generally perpendicular away from the main segment 271. An opposite end of the first sidewall 292 is integrally joined to an inward channel base wall 294, which extends generally perpendicular away from the first sidewall 292 (and generally parallel to the main segment 271). An opposite end of the base wall 294 is integrally joined to a second inward channel sidewall 293, which extends generally perpendicular away from the base wall 294 (and generally parallel to the first sidewall 292). The sidewalls 292 and 293 and the base wall 294 cooperate to define a generally U-shaped, inward channel 295 which cooperates with a compressible stop on the lower window sash to slidably secure the sash relative to the side jamb 200.

An opposite end of the second sidewall 293 is integrally joined to an inward end segment 296 which is generally coplanar with the main segment 271. A first nub 297 extends generally perpendicular away from an opposite end of the inward end segment 296. The base wall 294 extends beyond its juncture with the second sidewall 293 to provide a second nub 298. The second sidewall 293, the end segment 296, and the two nubs 297 and 298 cooperate to define a generally L-shaped groove 299. As shown in FIG. 5, the flared end 222 on the side jamb 220 inserts by snap fit into the groove 299, and the first nub 297 inserts by snap fit into the groove 220 on the side jamb 220. The base wall 294 and a portion of the main segment 271 effectively span the channel 212 on the side jamb 200 and thereby enclose the sash supporting hardware therein.

A similar, outward channel 275 is disposed on an opposite side of the spike 283. The outward channel 275 is defined by a first outward channel sidewall 272 integrally interconnected between (and generally perpendicular to) the main segment 271 and an end of an outward channel base wall 274, and a second outward channel sidewall 273 integrally interconnected between (and generally perpendicular to) an opposite end of the base wall 274 and an outward end segment 276. The outward end segment 276 extends to a distal end 279 and is coplanar with the main segment 271 and the inward end segment 296. A shoulder 277 extends from an intermediate portion of the outward end segment 276 and generally toward the central spike 283. The shoulder 277 and portions of the end segment 276 and the sidewall 273 cooperate to define a generally U-shaped channel 278 for purposes that will become apparent below.

With reference back to FIG. 3, the side jamb 200 includes still more snap fit structure, connected to an end of the channel wall 201 opposite the base wall 210. This additional structure includes three wall portions 241, 242, and 243 which are integrally connected to form what may be described as a J-shaped member, and which cooperate to define that defines a groove 240. The first wall portion 241 extends in opposite directions from its juncture with a distal end of the channel wall 201 and generally perpendicular thereto. The second wall portion 242 extends generally perpendicular from an inward end of the first wall portion 241, though angled somewhat toward the third wall portion 243, which is relatively larger than the second wall portion 242. The third wall portion 243 extends generally perpendicular from an opposite, outward end of the first wall portion 241 and terminates in a distal end 244. The third wall portion 243 functions as a screen support and a sash stop. As shown in FIG. 5, the second wall portion 242 snaps into the groove 278 and interengages the shoulder 277 on the cover 270, and the remainder of the outward end segment 276 on the cover 270 is retained within the groove 240 on the side jamb 200.

The profile of the side jamb 200 further includes a first outwardly extending wall 231 that extends generally perpendicular away from the channel wall 201, proximate its juncture with the first wall portion 241. Also, a second outwardly extending wall 232 extends generally perpendicular away from the third wall portion 243, proximate its juncture with the first wall portion 241. A connecting wall 233 extends between intermediate portions of the first wall 231 and the second wall 232, following the same general contour as the juncture between the first wall portion 241 and the third wall portion 243. The first wall 231 extends linearly to a distal end 234, from which a tab 235 extends toward the second wall 232 (and generally parallel to the connecting wall 233). The tab 235 cooperates with the first wall 231 and a portion of the connecting wall 233 to define an aluminum coil stock return suitable for receiving and retaining a zero plus bend.

The second wall 232 extends linearly beyond its juncture with the connecting wall 233 and generally parallel to the first wall 231. At a point opposite the end 234 of the first wall 231, the second wall 232 curves toward the first wall 231, terminating in a distal segment 236, which extends generally perpendicular relative thereto. The walls 231 and 232 cooperate to define a peripheral contour 239, and together with the connecting wall 233, cooperate to define a groove 230 for purposes that will become apparent below.

Connection of the head jamb to the side jambs 200 is facilitated by the fact that each of these members has the same profile. As a result, when ends of the head jamb and the side jambs 200 are cut at equal angles relative to one another, the structural components of the head jamb align with and can be readily welded to corresponding structural components of the side jambs 200. However, the profile of the sill jamb 100 differs significantly from that of the side jambs 200, and thus, various components of the respective profiles do not abut or join one another at a corner formed by the two distinct jambs 100 and 200. Such a corner is shown in FIGS. 1 and 14, together with additional hardware (a corner lock 300, a screw 390, and a screw 399) designed to effectively interconnect one of the side jambs 200 to the sill jamb 100.

Figure 1:
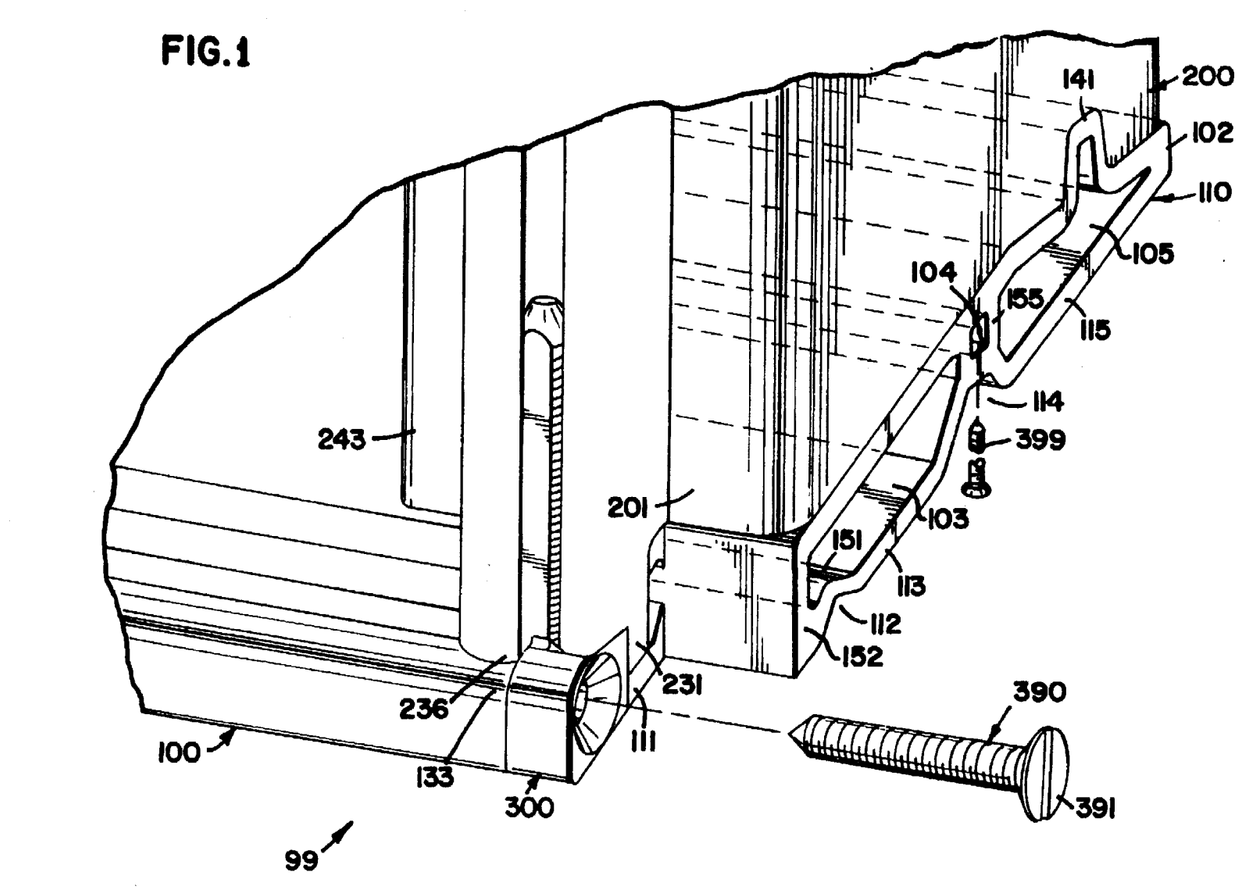
FIG. 1 is an isometric view of a portion of a double hung window assembly constructed according to the principles of the present invention.
Figure 14:
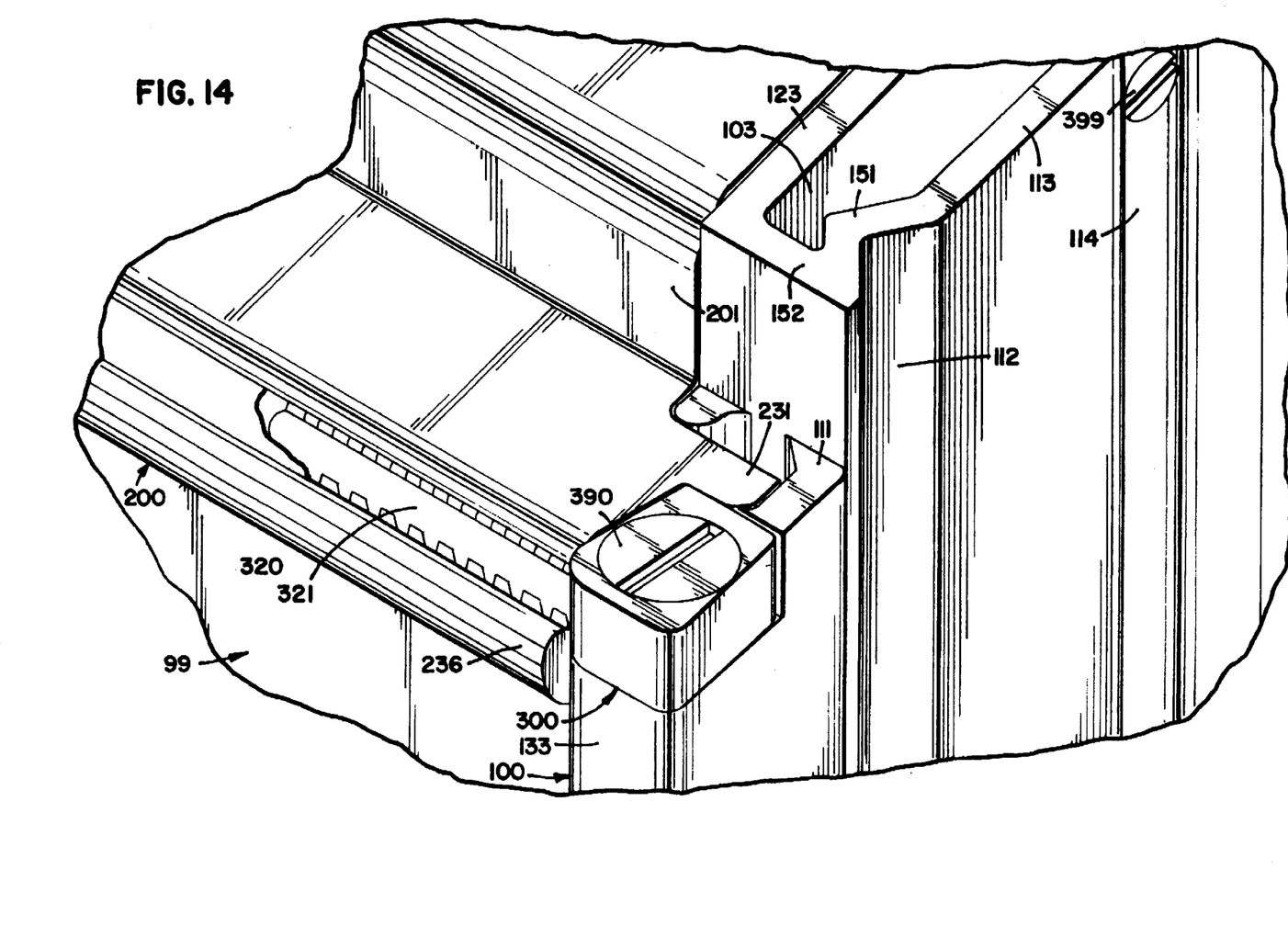
FIG. 14 is another isometric, partial view of the double hung window assembly of FIG. 1.

As shown in FIGS. 1 and 14, everything on the side jamb 200 to the inward side of and including the channel wall 201 is notched to receive and abut upwardly facing members on the sill jamb 100, including the angled sill segment 120 and the bottom sash support 140. The structural elements 231–239 that define the groove 230 extend relatively further and abut an upwardly facing surface on the lobe 130. The sill 100 is notched in such a manner that the angled sill segment 120 and the bottom sash support 140 extend relatively further than the lobe 130 and lie beneath the channels 211 and 212 of the side jamb 200; and an outermost portion of the lobe 130 is recessed to allow insertion of the corner lock 300 into the groove 230 on the side jamb 200 and subsequent alignment of the head of the corner lock 300 relative to of the lobe 130.

The corner lock 300 is configured to secure the right end of the sill jamb 100 to the lower end of the right side jamb 200, as viewed from outside the window 99. The corner lock 300 is shown in FIGS. 6–9 and generally includes a head portion 310 and a shaft portion 320. The head portion 310 may be described as generally block-shaped and having a trapezoidal cross-section with rounded corners. The cross-section has a perimeter 311 that corresponds to a portion of the perimeter 133 of the lobe 130. A frusto-conical bore 313 is formed in a face 312 on the head portion 310 and joins a cylindrical bore 314 formed through the head portion 310. The two bores 313 and 314 are sized and configured to allow the screw 390 to be inserted through the head portion 310 and countersunk relative thereto.

The shaft portion 320 extends from a juncture with the head portion 310 to a relatively pointed end. The shaft portion 320 includes a pair of generally flat sidewalls 321 and 322 which extend longitudinally or axially and generally parallel to one another and define a first effective diameter D1 therebetween. The shaft portion 320 further includes a pair of threaded sidewalls 323 and 324 which are separated by the flat sidewalls 321 and 322 and define a second, relatively larger effective diameter D2 therebetween. A right hand, helical thread 329 extends about the threaded sidewalls 323 and 324, interrupted by the flat sidewalls 321 and 322. The thread 329 is further interrupted by cuts or edges 327 and 328 made from an edge of a respective flat sidewall and across a respective threaded sidewall 323 and 324 at an angle A (approximately thirty degrees) relative to the respective flat sidewall 321 and 322.

Figure 15A:
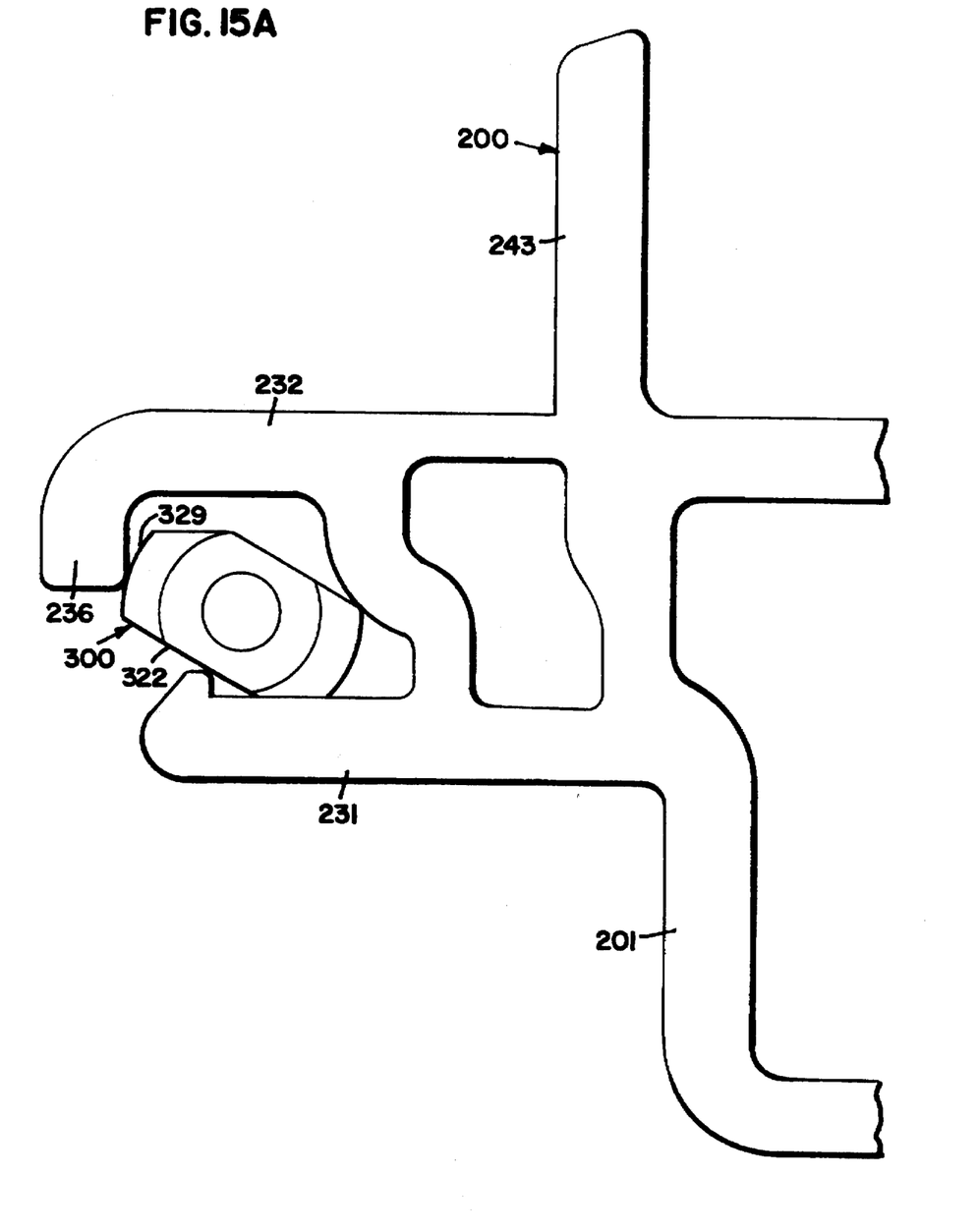
FIG. 15a is an end view of the corner lock member of FIGS. 6–9, shown in a first orientation relative to the side jamb member of FIG. 3.
Figure 15B:
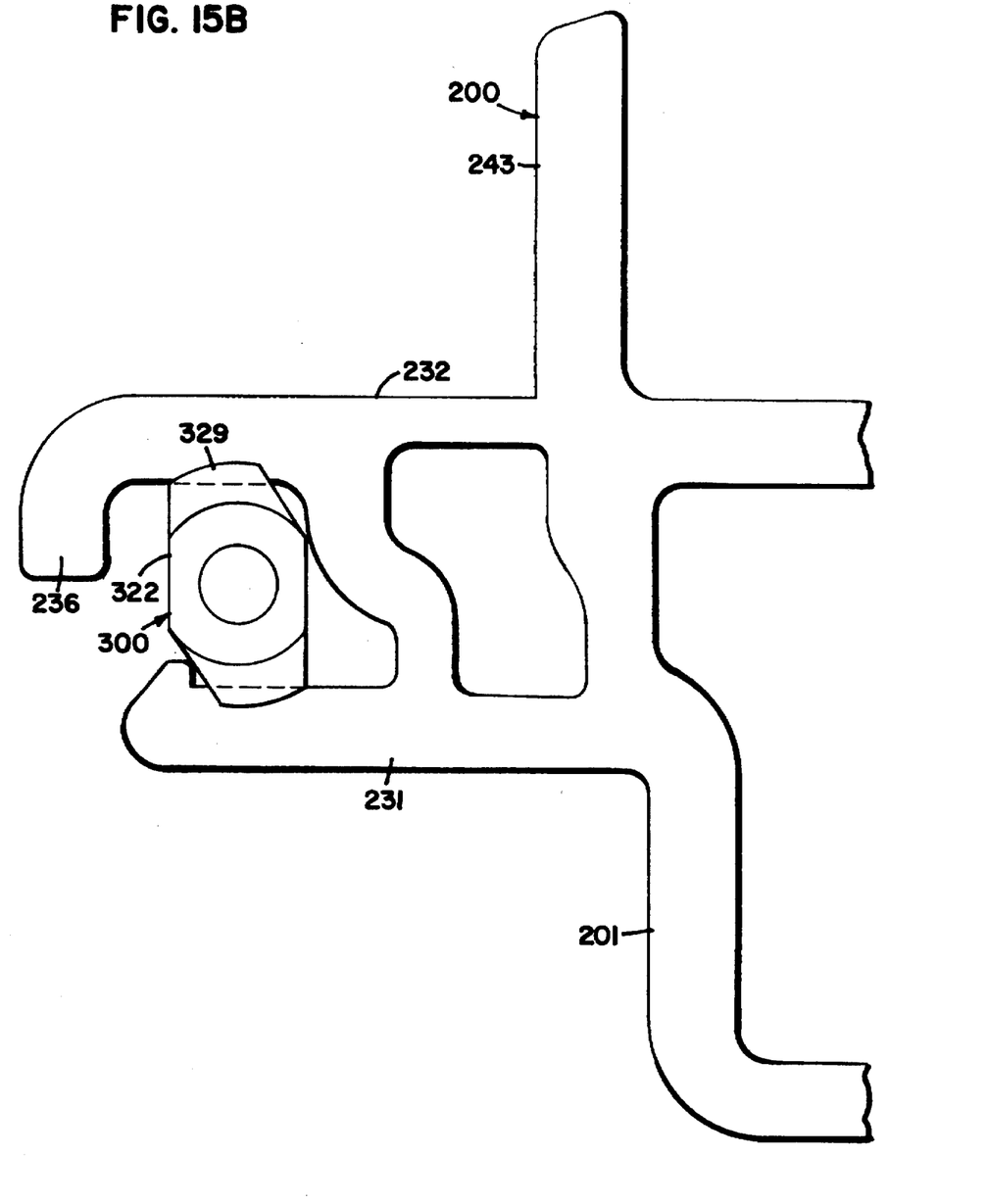
FIG. 15b is an end view of the corner lock member of FIGS. 6–9, shown in a second orientation relative to the side jamb member of FIG. 3.

The groove 230 on the side jamb 200 and the shaft portion 320 of the corner lock 300 are configured in such a manner that (a) the shaft portion 320 can be inserted or pushed with relatively little force into the groove 230 when in a first orientation relative thereto, as shown in FIG. 15a, and (b) when subsequently rotated clockwise, through an angle of approximately sixty degrees, to a second, locked orientation, as shown in FIG. 15b, the shaft portion 320 cannot be pulled from the groove 230 by a force comparable in magnitude to the insertion force. In particular, rotation of the corner lock 300 causes the threads 329 of the metal corner lock 300 to cut into the walls 231 and 232 of the side jamb 200, which is extruded from a composite material including wood and PVC.

When the corner lock 300 is rotated to the locked orientation relative to the side jamb 200, the face 312 is substantially flush with the first outwardly extending wall 231. When the side jamb 200 is subsequently aligned with the sill jamb 100, an opposite face on the corner lock 300 abuts the cut end of the lobe 130, and the perimeters 311 and 133 are substantially flush with one another and thus, form a substantially continuous surface. In order to provide sufficient overlap of the second outwardly extending wall 232 and the first upper segment 131, yet maintain a substantially flush relationship between the face 312 and the first outwardly extending wall 231, the juncture between the head portion 310 and the shaft portion 320 of the corner lock 300 is jogged or offset in the region designated as 319 in FIG. 8. As shown in FIGS. 1 and 14, the side jamb 200 and the sill jamb 100 are interconnected by means of (a) a screw 390 inserted through the hole 314 in the corner lock 300 and threaded into the compartment 109 (between the three nubs 137–139); and (b) a screw 399 threaded through the screw chase 104 and into the hourglass-shaped compartment 204 (between the nubs 258 and the transverse wall 254). The head 391 of the screw 390 is larger in diameter than the hole 314 through the through the head 310 of the corner lock. Thus, the corner lock head 310 is effectively captured between the screw head 391 and the lobe 130.

The opposite end of the sill jamb 100 is connected in similar fashion to the lower end of the left side jamb (not shown). The left hand corner lock 350 (as viewed from outside the window 99) is shown in FIGS. 10–13 and generally includes a head portion 360 and a shaft portion 370. The head portion 360 may be described as generally block-shaped and having a trapezoidal cross-section with rounded corners. The cross-section has a perimeter 361 that corresponds to a portion of the perimeter 133 of the lobe 130. A frusto-conical bore 363 is formed in a face 362 on the head portion 360 and joins a cylindrical bore 364 formed through the head portion 360. The two bores 363 and 364 are sized and configured to allow a screw to be inserted through the head portion 360 and countersunk relative thereto.

The shaft portion 370 extends from a juncture with the head portion 360 to a relatively pointed end. The shaft portion 370 includes a pair of generally flat sidewalls 371 and 372 which extend longitudinally or axially and generally parallel to one another and define a first effective diameter D1 therebetween. The shaft portion 370 further includes a pair of threaded sidewalls 373 and 374 which are separated by the flat sidewalls 371 and 372 and define a second, relatively larger effective diameter D2 therebetween. A left hand, helical thread 379 extends about the threaded sidewalls 373 and 374, interrupted by the flat sidewalls 371 and 372. The thread 379 is further interrupted by cuts or edges 377 and 378 made from an edge of a respective flat sidewall and across a respective threaded sidewall 373 and 374 at an angle A (approximately thirty degrees) relative to the respective flat sidewall 371 and 372.

The groove 230 on the side jamb and the shaft portion 370 of the corner lock 350 are configured in such a manner that (a) the shaft portion 370 can be inserted or pushed with relatively little force into the groove 230 when in a first orientation relative thereto, and (b) when subsequently rotated clockwise, through an angle of approximately sixty degrees, to a second, locked orientation, the shaft portion 370 cannot be pulled from the groove 230 by a force comparable in magnitude to the insertion force. In particular, rotation of the corner lock 350 causes the threads 379 of the metal corner lock 350 to cut into the walls 231 and 232 of the side jamb, which is extruded from a composite material including wood and PVC.

When the corner lock 350 is rotated to the locked orientation relative to the side jamb, the face 362 is substantially flush with the first outwardly extending wall 231. When the side jamb is subsequently aligned with the sill jamb 100, an opposite face on the corner lock 350 abuts the cut end of the lobe 130, and the perimeters 361 and 133 are substantially flush with one another and thus, form a substantially continuous surface. In order to provide sufficient overlap of the second outwardly extending wall 232 and the first upper segment 131, yet maintain a substantially flush relationship between the face 362 and the first outwardly extending wall 231, the juncture between the head portion 360 and the shaft portion 370 of the corner lock 350 is jogged or offset in the region designated as 369 in FIG. 12. The opposite side jamb and the sill jamb 100 are interconnected by means of (a) a screw inserted through the hole 364 in the corner lock 350 and threaded into the compartment 109 (between the three nubs 137–139); and (b) a screw threaded through the screw chase 104 and into the hourglass-shaped compartment 204 (between the nubs 258 and the transverse wall 254). The head of the screw is larger in diameter than the hole 364 through the through the head 360 of the corner lock. Thus, the corner lock head 360 is effectively captured between the screw head and the lobe 130.

Although the present invention is described with reference to a preferred embodiment and a particular application, those skilled in the art will recognize alternative embodiments and applications that fall within the scope of the present invention. Thus, the scope of the present invention is to be limited only to the extent of the following claims.

I claim:

1. A window, comprising:
   at least one window sash;
   frame members disposed about said at least one window sash, wherein an end of a first frame member is connected to an end of a second frame member, and an opening extends lengthwise into said end of said first frame member, and said opening has a longitudinal axis; a first effective diameter as measured in a first direction perpendicular to said longitudinal axis; and a second effective diameter as measured in a second direction perpendicular to said longitudinal axis;
   a first fastener having a first end and a second, opposite end, wherein said first end is inserted into said end of said first frame member; and
   a second fastener having a first end; a second, opposite end; and a shaft extending therebetween, wherein said first end is inserted through said second, opposite end of said first fastener and into said end of said second frame member, and said second, opposite end cooperates with said end of said second frame member to retain said second, opposite end of said first fastener therebetween, and wherein said shaft has a longitudinal axis; a first effective diameter as measured in a first direction perpendicular to said longitudinal axis of said shaft; and a second effective diameter as measured in a second direction perpendicular to said longitudinal axis of said shaft and bounded by at least one ridge extending substantially radially about a portion of said shaft, and said second effective diameter of said opening is at least as great as said second effective diameter of said shaft, and said first effective diameter of said opening is at least as great as said first effective diameter of said shaft and is less than said second effective diameter of said shaft.

2. A window according to claim 1, wherein said at least one ridge is an intermittent helical thread disposed about said longitudinal axis of said shaft.

3. A window according to claim 2, wherein said first effective diameter of said shaft is bounded by flat surfaces extending along said shaft.

4. A window according to claim 1, wherein said opening is a substantially P-shaped slot.

5. A window according to claim 4, wherein when said shaft occupies a first orientation relative to said opening, said at least one ridge extends between a distal corner and a diagonally opposed corner of said P-shaped slot, and when said shaft occupies a second orientation relative to said opening, said at least one ridge cuts into parallel, unequal length sidewalls of said P-shaped slot.

6. A corner assembly connecting a first window frame segment at a desired angle relative to a second window frame segment, comprising:
   a first member having a shaft portion and a head portion, wherein said head portion has a greater effective diameter than said shaft portion; and
   a second member having a first portion and a second portion, wherein said first portion cooperates with an opening in an end of the first window frame segment in such a manner that when said second member occupies a first orientation relative to the opening, said first portion is readily movable into and out of the opening; and when said second member is rotated to a second orientation relative to the opening, said first portion is anchored within the opening, and said second portion is proximate an adjacent end of the second window frame segment, and said shaft portion of said first member extends through said second portion and into the adjacent end of the second window frame segment, and said second portion is retained between the second window frame segment and said head portion of said first member.

7. A corner lock according to claim 6, wherein said first portion means has a cross-section that is perpendicular to a longitudinal axis about which said second member rotates between said first orientation and said second orientation, and said cross-section has opposite sides that are substantially straight and other opposite sides that are substantially arcuate.

8. A corner lock according to claim 7, wherein said substantially arcuate sides define a greater effective diameter than said substantially straight sides.

9. A corner lock according to claim 8, wherein said substantially arcuate sides are defined by ridges extending substantially perpendicular to said longitudinal axis.

10. A corner lock according to claim 6, wherein said first portion means includes a shaft having at least one relatively flat surface extending lengthwise along said shaft, and having at least one pointed ridge extending substantially radially about a portion of said shaft excluding said at least one flat surface.

11. A corner lock according to claim 10, wherein said at least one ridge is trimmed by a plane extending at an obtuse angle relative to said at least one flat surface and through a juncture between said at least one pointed ridge and said at least one flat surface.

12. A corner lock according to claim 11, wherein said first member is a screw.

13. A corner lock according to claim 12, wherein said first portion, is a threaded shaft, and said second portion is a ring integrally joined to an end of said threaded shaft.

14. A corner lock according to claim 13, wherein at least one flat surface extends lengthwise along said threaded shaft, and at least one flat surface extends lengthwise along the opening.

15. A corner assembly connecting a first window frame segment at a desired angle relative to a second window frame segment, comprising:
   a first member having a shaft portion and a head portion, wherein said head portion has a greater effective diameter than said shaft portion; and
   a second member having a threaded shaft and a ring, wherein said threaded shaft is anchored within an opening in an end of the first window frame segment, and said ring is proximate an adjacent end of the second window frame segment, and said shaft portion of said first member extends through said ring and into the adjacent end of the second window frame segment, and said ring is retained between said head portion and the second window frame segment.

16. A corner lock according to claim 15, wherein said ring and the second window frame segment define a substantially smooth and continuous surface.

17. A corner assembly according to claim 16, wherein said ring is offset from a longitudinal axis of said threaded shaft, thereby allowing a first sidewall of the opening to abut the second window frame segment, and a second, opposite sidewall of the opening to be flush with an outer surface on said ring.

18. A corner lock according to claim 15, wherein said threaded shaft is radially aligned relative to said ring, and said first member and said second member cooperate to fasten the first window frame member substantially perpendicular to the second window frame member.

19. A method of fastening a first frame component relative to a second frame component, comprising the steps of:

forming an opening in the first frame component in such a manner that the opening has a first effective diameter as measured in a first direction perpendicular to a longitudinal axis of the opening and a second effective diameter as measured in a second direction perpendicular to the longitudinal axis of the opening, wherein the second effective diameter is greater than the first effective diameter;

selecting a first fastener with a shaft having a corresponding first effective diameter as measured in a corresponding first direction perpendicular to a longitudinal axis of the fastener, and having a corresponding second effective diameter as measured in a corresponding second direction perpendicular to the longitudinal axis of the fastener, wherein the corresponding second effective diameter is defined by at least one ridge extending about a portion of the first fastener, substantially radially about the longitudinal axis thereof, and with a head connected to an end of the shaft and having a hole formed therethrough at a desired angle relative to the longitudinal axis of the shaft;

orienting the shaft relative to the opening in such a manner that the first effective diameter and the corresponding first effective diameter are substantially coplanar and the second effective diameter and the corresponding second effective diameter are substantially coplanar;

inserting the shaft into the opening;

rotating the shaft within the opening in such a manner that at least one ridge engages a sidewall of the opening and the hole through the head substantially aligns with a connecting member on the second frame component;

selecting a second fastener with a shaft having a diameter less than that of the hole, and with a head having a diameter greater than that of the hole;

inserting the shaft of the second fastener through the hole and into the connecting member on the second frame component; and securing the shaft of the second fastener relative to the second frame component.

20. A method according to claim 19, wherein the step of forming an opening in the first frame component is performed during extrusion of the first frame component from a composite material of wood and plastic.

* * * * *